United States Patent
Machulsky et al.

(10) Patent No.: US 10,191,865 B1
(45) Date of Patent: Jan. 29, 2019

(54) CONSOLIDATING WRITE TRANSACTIONS FOR A NETWORK DEVICE

(71) Applicant: Amazon Technologies, Inc., Seattle, WA (US)

(72) Inventors: Georgy Machulsky, San Jose, CA (US); Netanel Israel Belgazal, Qiryat Bialik (IL); Said Bshara, Tira (IL); Nafea Bshara, San Jose, CA (US); Adi Habusha, Moshav Alonei Abba (IL)

(73) Assignee: Amazon Technologies, Inc., Seattle, WA (US)

( * ) Notice: Subject to any disclaimer, the term of this patent is extended or adjusted under 35 U.S.C. 154(b) by 265 days.

(21) Appl. No.: 15/099,546

(22) Filed: Apr. 14, 2016

(51) Int. Cl.
| | |
|---|---|
| *G06F 13/24* | (2006.01) |
| *G06F 13/16* | (2006.01) |
| *G06F 13/28* | (2006.01) |
| *G06F 13/40* | (2006.01) |
| *G06F 13/42* | (2006.01) |
| *G06F 9/455* | (2018.01) |

(52) U.S. Cl.
CPC ......... *G06F 13/16* (2013.01); *G06F 9/45558* (2013.01); *G06F 13/24* (2013.01); *G06F 13/28* (2013.01); *G06F 13/4068* (2013.01); *G06F 13/4282* (2013.01); *G06F 2009/45579* (2013.01); *G06F 2009/45583* (2013.01)

(58) Field of Classification Search
CPC ......... G06F 13/24; G06F 3/0659; G06F 3/061
See application file for complete search history.

(56) References Cited

U.S. PATENT DOCUMENTS

| | | | | |
|---|---|---|---|---|
| 7,676,603 | B2 * | 3/2010 | Creta | .................. G06F 13/4027 710/5 |
| 7,788,435 | B2 * | 8/2010 | Worthington | ......... G06F 9/4812 710/263 |
| 8,606,975 | B2 * | 12/2013 | Srinivasan | ............ G06F 13/102 709/212 |

\* cited by examiner

*Primary Examiner* — Idriss N Alrobaye
*Assistant Examiner* — Richard B Franklin
(74) *Attorney, Agent, or Firm* — Kilpatrick Townsend & Stockton LLP

(57) ABSTRACT

A network device stores information associated with a packet in a queue. The network device sends an interrupt to a host to notify the host of completion of processing the packet. A Memory-Mapped Input/Output (MMIO) write transaction is received that includes a pointer update associated with the queue and an interrupt unmasking value. The pointer is updated and the interrupt is unmasked based on receiving the single MMIO write transaction.

18 Claims, 8 Drawing Sheets

US 10,191,865 B1

CONSOLIDATING WRITE TRANSACTIONS FOR A NETWORK DEVICE

BACKGROUND

Computing systems may include network devices that add to the functionality of the computing system. In many cases, network devices are connected to the computing system using an interconnect. The interconnect may implement a standard bus protocol, such as any of the Peripheral Component Interconnect (PCI) family of bus protocols. It is common for the network device to be in the form of a network interface card (NIC) that is interconnected with the host processor by way of an interconnect. A host processor may send packets to the NIC for transmission onto a network. The host processor may receive packets from the NIC that have been received from the network.

In some environments, a plurality of virtual machines (VMs) are running on the host processor. Each VM may have a need to send and receive network packets. Sending and receiving network packets causes traffic on the interconnect between the network NIC and the host processor.

BRIEF DESCRIPTION OF THE DRAWINGS

Various embodiments in accordance with the present disclosure will be described with reference to the drawings, in which.

DETAILED DESCRIPTION

Figure 1:
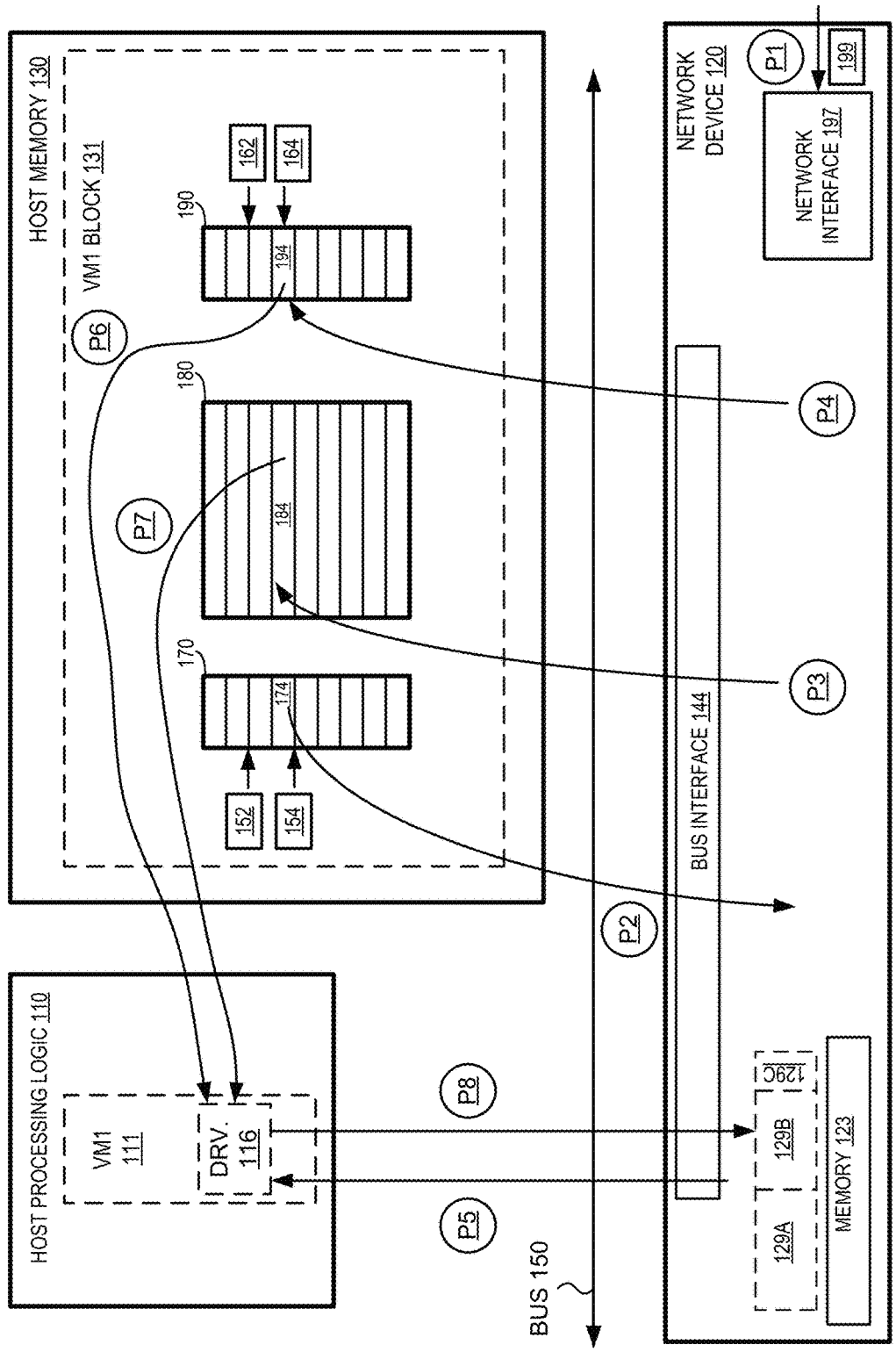
FIG. 1 illustrates a hybrid block diagram flow showing an example process of consolidating write transactions on a bus.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Systems, devices, and methods of the disclosure describe consolidating write transaction from a host to a network device. In the disclosure, an example computing system includes a host processor, a host memory, and a network device, which are interconnected by a PCI-based bus. When a packet is received by the network device, the network device may write the packet to the host memory and generate an interrupt to the host processor to alert the processor that a packet is available for processing. The host processor may then process the packet and consolidate more than one data elements related to packet processing into a single write transaction to the network device. Conventionally, the data elements are written in different Memory-Mapped Input/Output (MMIO) write transactions over the PCI-based bus. MMIO refers to using a same addressing scheme on a same bus (e.g. bus 150) so that a processing logic (e.g. host processing logic 110) may address both a memory (e.g. host memory 130) and additional devices (e.g. network device 120) using the same addressing scheme and the same bus. Consolidating the data elements into a single MMIO write transaction reduces the bus traffic. In contexts where multiple virtual machines (VMs) are running on a single host processor (and receiving their own packets and own interrupts), reducing the traffic on the PCI-based bus increases the packet processing speed of the computing system.

In a particular implementation, the network device may be a Network Interface Card (NIC). When a packet is received at the NIC, the NIC writes the packet to packet memory of the host memory. The NIC may then write a completion queue entry to a completion queue in the host memory. Then, the NIC may send an interrupt to the host processor to alert the host processor that the packet is available for processing. The packet may be written from the NIC to the packet memory over the PCI-based bus using a DMA engine of the NIC. The interrupt may be a Message Signaled Interrupt (MSI) that is sent from the NIC to the host processor over the PCI-based bus. The host processor may retrieve the packet from the host memory and then update a Completion Queue head pointer to indicate a location of the completion queue that has been processed by the host processor. The completion queue head pointer, an interrupt delay value, and an interrupt unmasking value may then be sent from the host processor to the NIC in a single MMIO write transaction to a register of the network device.

A similar process can be used to transmit a packet. To transmit a packet on network, a driver of a host may submit the packet to a packet memory in host memory. The driver may notify network device that the packet is ready for transmission. In response to receiving the notifier, the network device may fetch the packet from the packet memory. When the packet is fetched from the packet memory in host memory, it can be transmitted onto a network by a network interface. The network device may write a completion queue entry (CQE) to a completion queue in the host memory to inform the host processing logic that the packet was transmitted onto the network. After the network device writes the CQE, it may send an interrupt associated with the particular completion queue that the packet was written to. After the host processing logic receives the interrupt, it may send the network device a single MMIO write transaction that includes an interrupt unmasking value to unmask the interrupt and a completion queue head pointer that indicates the last CQE of the completion queue that was processed by host processing logic 110, and an interrupt delay value. Again, by consolidating these data elements in to a single MMIO write transaction, bus write transactions are reduced.

FIG. 1 illustrates a hybrid block diagram flow showing an example process of consolidating write transactions into a single write transaction from a host processing logic 110 to a network device 120. FIG. 1 includes host processing logic 110, a network device 120, a host memory 130, and a bus 150. In one embodiment, a "host" includes host processing logic 110 and host memory 130. Although FIG. 1 includes blocks to represent particular hardware, the electrical connections illustrated in FIG. 1 are not necessarily complete as FIG. 1 is presented to show the flow of a process that includes the illustrated hardware components.

Host processing logic 110 may include one or more processors, microprocessors, field-programmable gate arrays (FPGAs) or other suitable processing logic. The processors may be general purpose computing devices such as are manufactured by Intel®, AMD® ARM®, Qualcomm®, and others. The processors are generally capable of executing software code. A processor may include multiple processing cores.

The host memory 130 may provide temporary or long-term storage for data that may be accessed by host processing logic 110. The host memory 130 may include Dynamic Random Access Memory (DRAM), Synchronous DRAM (SDRAM), and/or Double Data Rate (DDR), among others. In some cases, host memory 130 may also include Read-Only Memory (ROM), such as Programmable Read-Only Memory (PROM), Erasable Programmable Read-Only Memory (EPROM), Electrically Erasable Programmable Read-Only Memory (EEPROM), and/or Flash EEPROM, among others.

Bus 150 in FIG. 1 may be any suitable bus for writing data from host processing logic 110 to network device 120. Bus 150 is also used by network device 120 for accessing and storing data stored in host memory 130, as will be described in more detail below. Bus 150 implements one or more variations of the Peripheral Component Interconnect (PCI) standard bus protocols, in some embodiments. A bus is a communication channel that transfers data within a computing system, or between a computing system and other devices. A standard bus protocol is a data transfer protocol for which a specification has been defined and adopted by various manufacturers. Manufacturers ensure that compliant devices are compatible with computing systems implementing the bus protocol, and vice versa. PCI describes a family of related, standardized bus protocols. PCI includes the original PCI standard, PCI-eXtended (PCI-X), Accelerated Graphics Port (AGP), and PCI Express (PCIe, also referred to as PCI-XP). The term "PCI" or "PCI-based" may be used herein to describe any protocol in the PCI family of bus protocols. Other bus protocols can be used for bus 150, such as for example, Industry Standard Architecture (ISA), Extended ISA (EISA), Video Electronics Standards Association (VESA), Micro Channel, and any of the Advanced Technology Attachment (ATA) family of protocols, among others. The illustrated example can also be implemented with a combination of standard bus protocols, a combination of proprietary bus protocols, and/or a combination of standard and proprietary bus protocols.

FIG. 1 is an example of a network packet receive flow. FIG. 1 illustrates virtual machines (VM) VM1 111 running on host processing logic 110 for purposes of demonstrating a flow that may correspond with one VM running on host processing logic 110. However, it is understood that a plurality of VMs may run on host processing logic 110 and that similar flows may apply to each VM running on host processing logic 110. In one example, 64 VMs run on host processing logic 110, which may have multiple processing cores. Each of the VMs may execute a respective guest operating system on host processing logic 110.

In FIG. 1, VM1 111 has a corresponding memory block 131 in host memory 130. The host memory block 131 corresponding to VM1 111 may be used to store executable instructions and data generated by VM1 111. A portion of memory block 131 may be reserved for (and be accessible to) a driver 116 of VM1 111 that interacts with network device 120. For example, a portion of block 131 may be reserved for driver 116 to read and write packet data. In the illustrated example, submission queue descriptor list 170, packet memory 180, and completion queue 190 are accessible to driver 116.

In FIG. 1, process block P1 shows network device 120 receiving a packet 199 at the network interface 197. Network device 120 is a Network Interface Card (NIC), in one example. Network interface 197 may be an ethernet interface, for example. Network interface 197 may, for example, include physical connectors or physical ports for wired connection to a network, and/or antennas for wireless communication to a network. Network interface 197 may further include hardware and/or software configured to implement a network protocol stack.

At processing block P2 of FIG. 1, the network device 120 reads a descriptor entry in submission queue descriptor list 170. In FIG. 1, descriptor entry 174 is read. Although not illustrated, processing logic of network device 120 may execute portions of the processes described in connection with FIG. 1. The processing logic may include integrated circuits, processors, systems-on-chip (SoCs), application-specific integrated circuits (ASICs), or field-programmable gate arrays (FPGAs)) and memory. The processing logic can be configured to operate according to firmware and/or software instructions. The network device 120 reading the descriptor entry may include a direct memory access (DMA) engine of the processing logic accessing the descriptor entry utilizing bus interface 144 and bus 150. Referring again to process block P2, a descriptor tail pointer 154 stored in a register (not illustrated) of the network device 120 may point to the descriptor entry. Descriptor list tail pointer 154 indicates the last descriptor entry submitted by driver 116, which is descriptor entry 174 in the illustrated embodiment. Descriptor tail pointer 154 is incremented by driver 116. A descriptor list head pointer 152 indicates where network device 120 is (the last processed descriptor entry) in processing the submission queue descriptor list 170. In FIG. 1, the submission queue descriptor list 170 is shown in host memory 130, although submission queue descriptor list 170 may also be stored on the network device 120 in memory 123, for example. Memory 123 may include Dynamic Random Access Memory (DRAM), Synchronous DRAM (SDRAM), and/or Double Data Rate (DDR), among others. A portion of memory 123 may be reserved for Memory-Mapped Input/Output (MMIO) write transactions initiated by host processing logic 110.

In processing block P3 of FIG. 1, the network device 120 writes packet data from the packet to a packet memory location included in a packet memory 180 in host memory 130. The network device 120 may utilize the DMA engine to write the packet data (e.g. packet payload) to the packet memory location of packet memory 180 over the bus 150 via bus interface 144. In the illustrated embodiment, packet memory location 184 is the packet memory location that the packet data is written to. The packet memory location 184 is described by the descriptor entry read in process block P2. Submission queue descriptor list 170 and packet memory 180 may have a one-to-one correspondence. For example, descriptor entry 174 in submission queue descriptor list 170 may describe packet memory location 184 in packet memory 180.

In process block P4, network device 120 writes a completion queue entry (CQE) to completion queue 190. The CQE points to the corresponding packet location in packet memory 180. For example, CQE 194 may point to packet location 184 of packet memory 180. The network device 120 may utilize the DMA engine to write the CQE to the completion queue 190 over the bus 150 via bus interface 144. Completion queue 190 may have a one-to-one correspondence with submission queue descriptor list 170. Alternatively, completion queue 190 may service a plurality of submission queue descriptor lists 170. Writing a CQE to completion queue 190 gives the driver 116 the packet location of the corresponding packet in the packet memory 180.

In process block P5, network device 120 sends an interrupt to driver 116 of VM1 111 running on host processing logic 110. This interrupt notifies driver 116 that packets in packet memory 180 are ready for processing. In one example, the interrupt is sent as a Message Signaled Interrupt (MSI) or MSI-X over a PCI-based bus 150 via bus interface 144. As noted above, a plurality of VMs having corresponding blocks of memory (e.g. block 131) may be running on host processing logic 110. In these implementations, each of the completion queues corresponding to different VM drivers may have their own corresponding interrupt. Although FIG. 1 illustrates the interrupt in process block P5 being generated using bus interface 144, it is understood that the interrupt may be generated in ways other than through bus interface 144 and bus 150.

In response to receiving the interrupt, the VM that corresponds to the interrupt starts (or resumes) processing the CQE in completion queue 190. Process block P6 of FIG. 1 shows driver 116 of VM1 111 accessing CQE 194. In process block P7, VM1 111 retrieves the packet from packet memory location 184 using the CQE 194 (since CQE 194 points to 184). To keep track of which of the packets in the packet memory 180 have been processed by the VM1 111 running on host processing logic 110, a Completion Queue head pointer 162 is updated to indicate the location in the completion queue 190 that has been processed by the VM1 111 running on host processing logic 110. Completion Queue tail pointer 164 indicates the last CQE that network device 120 wrote to completion queue 190.

The Completion Queue head pointer 162 may need to be communicated to network device 120 so that network device 120 doesn't overwrite packets to packet memory 180 that have not been processed by VM1 111 yet. In process block P8, driver 116 updates Completion Queue head pointer 162 and sends it to network device 120. In one implementation, the Completion Queue head pointer is 16 bits.

The host processing logic 110 may also need to send network device 120 an interrupt delay value for use with an interrupt coalescing mechanism that can reduce the frequency of interrupts generated. In one implementation, the delay value is 15 bits. Each bit may represent a microsecond delay period between the network device 120 writing the CQE to completion queue 190 (process block P4) and generating the interrupt (process block P5). If heavy streams of packets are being received, driver 116 may want the stream to be sent to host memory 130 as a group and make the delay value longer so that the frequency of the interrupts is lower to reduce processing resource utilization of host processing logic 110. In contrast, where the packets are trickling in one-by-one, immediate interrupts may be preferable since there is less risk of overloading the processing burden of host processing logic 110. In this case, the interrupt delay value may be low so that there is little or no delay between writing the CQE to completion queue 190 and generating the interrupt.

The host processing logic 110 may also need to send network device 120 an interrupt unmasking value to unmask an interrupt bit that has been set. Conventionally, when the host processing logic 110 was done processing the completions from completion queue 190, it would write an interrupt unmask register of the device memory 123 to signal to network device 120 that the host is done processing the completions. In one implementation of this disclosure, the interrupt unmasking value is one bit. After network device 120 sends the host processing logic 110 the interrupt in process block P5, further interrupts will not be delivered from the network device 120 to the host processing logic 110 between sending interrupt and receiving the interrupt unmasking value. When the interrupt unmasking value unmasks the interrupt, the interrupt can be generated again.

Conventionally, the completion queue head pointer, the interrupt delay value, and the interrupt unmasking value are sent in three separate MMIO write transactions. However, in process block P8 in FIG. 1, the completion queue head pointer, the interrupt delay value, and the interrupt unmasking value are consolidated into a single MMIO write transaction to register 129. The single MMIO transaction may also be written to a memory location reserved for MMIO write transactions in memory 123. In the illustrated example, portion 129A of register 129 is 16 bits and receives the completion queue head pointer, portion 129B of register 129 is 15 bits and receives the interrupt delay value, and portion 129C of register 129 is 1 bit and receives the interrupt unmasking value. By consolidating two or more of these data elements into a single MMIO write, the bus traffic on bus 150 is reduced.

When network device 120 receives the single MMIO write transaction of process block P8, processing logic of network device 120 may update its own Completion Queue head pointer and unmask the interrupt associated with the particular VM that sent the MMIO write transaction. If the single MMIO write transaction also includes an interrupt delay value, network device 120 also updates its delay time between writing a CQE entry and sending the interrupt.

Although FIG. 1 illustrates process blocks P1-P8 that describe a receive process of receiving the packet 199, a similar process can be used to transmit a packet. To transmit a packet on network interface 197, driver 116 may submit the packet to a packet memory in host memory. The packet memory may be located in a different memory location than packet memory 180. Driver 116 may also places a descriptor entry in a submission queue descriptor list that is different than submission queue descriptor list 170. The descriptor entry points to the packet in the packet memory. The driver 116 may notify network device 120 that the packet is ready for transmission. Driver 116 may notify network device 120 by writing to a doorbell register of network device 120, for example. In response to receiving the notifier, network device 120 may access the descriptor entry and then fetch the packet from the packet memory using the descriptor entry. When the packet is fetched from the packet memory in host memory, it can be transmitted onto a network by network interface 197. The network device 120 may write a completion queue entry (CQE) to a completion queue in the host memory 130 to inform the host processing logic 110 that the packet was transmitted onto the network. After the network device 120 writes the CQE, it may send an interrupt (e.g. MSI) associated with the particular completion queue to driver 116 of host processing logic 110. The driver 116 can then process the CQE one-by-one and release the resources associated with the packet (e.g. packet memory and submission queue descriptor list). After the host processing logic 110 receives the interrupt, it may send the network device 120 a single MMIO write transaction that includes an interrupt unmasking value to unmask the interrupt and a completion queue head pointer that indicates the last CQE of the completion queue that was processed by the driver 116 of host processing logic 110. Receiving the completion queue head pointer alerts network device 120 to where in the completion queue that the driver 116 has processed. An interrupt delay value may also be included in the single MMIO write transaction.

Figure 2:
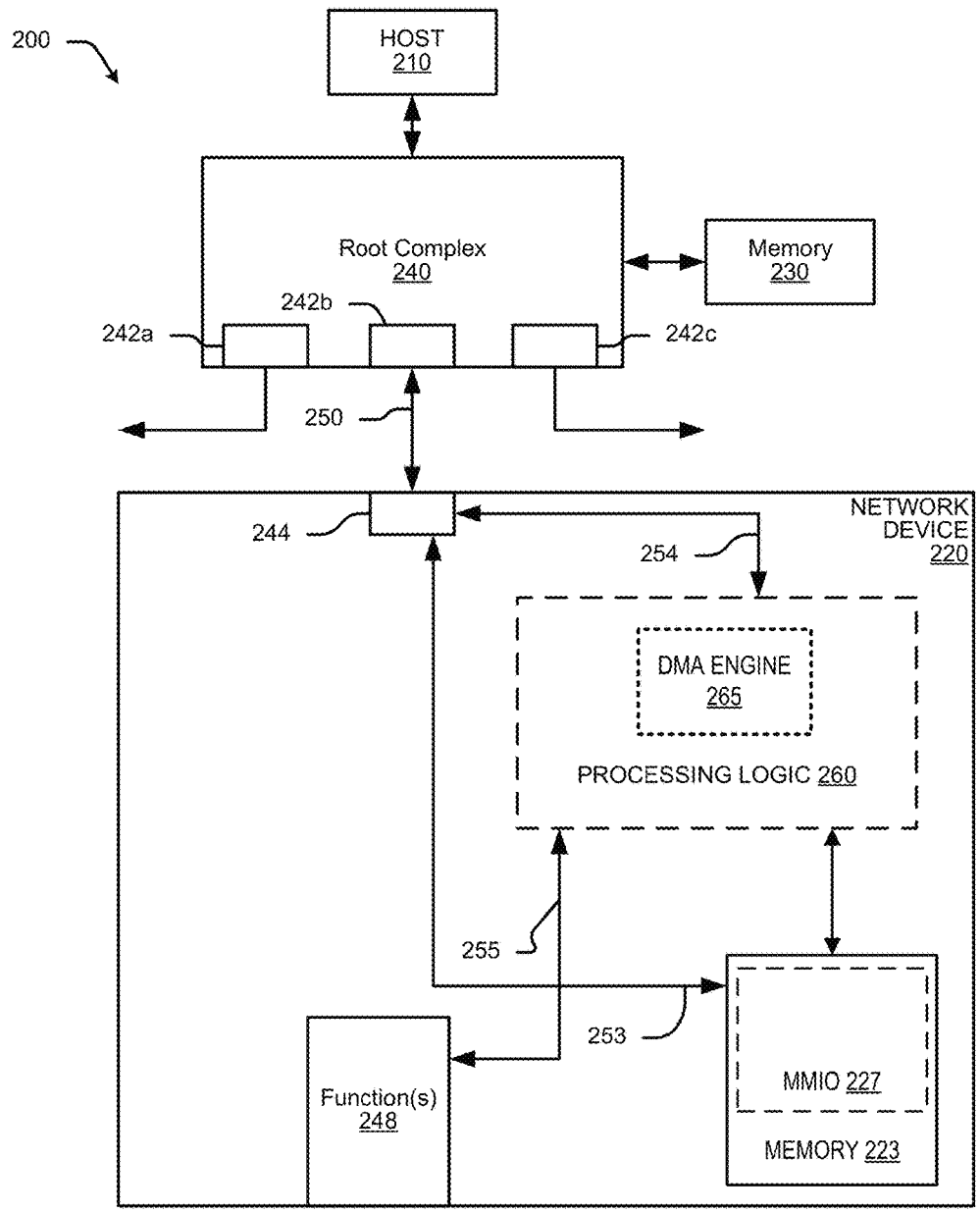
FIG. 2 illustrates an example of a computing system including a host, a memory, and a network device being interconnected.

FIG. 2 illustrates an example of a computing system 200 including host processing logic 210, a memory 230, and a network device 220. Host processing logic 210 is an example of host processing logic 110 and network device 220 is an example of a network device 120. Memory 230 may be used as host memory to host processing logic 210 and may be an example of host memory 130. In the illustrated example, the network device 220 is in communication with a root complex 240 over a PCI interconnect 250. PCI interconnect 250 is one example of bus 150. The root complex 240 is in communication with host processing logic 210 and a memory subsystem 230. In some implementations, the root complex 240 may include a memory controller to manage transactions to and from memory 230. In other implementations, host processing logic 210 may include a memory controller. The MMIO write transaction described in connection with process block P8 in FIG. 1 may be routed from host processing logic 210 to network device 220 via root complex 240. The functions describe in connection with process block P2, P3, P4, and P5 may be routed from network device 220 to host processing logic 210 and/or host memory 230 via root complex 240.

Memory subsystem 230 provides temporary or long-term storage for data that may be used by the computing system 200. The root complex 240 may include one or more ports 242a-c. These ports 242a-c may be connected, using additional PCI interconnects, to PCI switches, bridges, and endpoints, including the illustrated network device 220, which may be a PCI endpoint. The root complex 240 may route transactions between the host processing logic 210 and any of the endpoints, switches, or bridges, or between the endpoints, switches, and bridges themselves. In this example, PCI is used as an example of a bus protocol that may be implemented by the computing system 200 to connect to network device 220 and/or other peripheral devices. In various implementations, the computing system 200 can alternatively or additionally connect to peripheral devices using other bus protocols, such as SCSI, SATA, or PATA, among others, or a combination of different bus protocols including PCI.

The illustrated network device 220 includes processing logic 260. Processing logic 260 may include a DMA engine 265 for directly accessing host memory 230. For example, DMA engine 265 may be used to execute process blocks P2, P3, and P4. Process logic 260 may also generated the interrupt described in connection with process block P4. Processing logic 260 may include one or more processors, microprocessors, field-programmable gate arrays (FPGAs) or other suitable processing logic. The processors may be general purpose computing devices such as are manufactured by Intel®, AMD®, ARM®, Qualcomm®, and others. Processing logic 260 is generally capable of executing software code. A processor may include multiple processing cores.

The illustrated network device 220 in this example includes a bus interface 244, which may be a PCI-based bus interface configured to send and receive data on a PCI-based bus. Bus interface 244 is an example of bus interface 144. Bus interface 244 may include a physical interface for connecting to a cable, socket, port, or other connection to the PCI interconnect 250. The bus interface 244 may further include hardware and/or software to manage incoming and outgoing transactions. The bus interface 244 may translate an internal transaction generated by function(s) 248 or processing logic 260 into a PCI transaction for transmission over the PCI interconnect 250. The bus interface 244 may further translate transactions received over the PCI interconnect 250 for transfer to processing logic 260.

MMIO memory 227 in memory 223 is reserved for MMIO write transactions, in FIG. 2. MMIO memory 227 may be reserved in an initialization process upon startup of a computing system, for example. Memory 223 may include Dynamic Random Access Memory (DRAM), Synchronous DRAM (SDRAM), and/or Double Data Rate (DDR), among others.

Network device 220 includes function(s) 248, in the illustrated embodiment. Function 248 may include network interface 197. Function(s) 248 may include hardware and/or software that provide one or more services for the network device 220. A service in this context describes the operations and capabilities of the network device 220, and the functionality that the network device 220 provides to the computing system 200. Function(s) 248 may include the hardware and/or software to provide a network interface, including ports for connecting Category-5 (CAT-5) cables, and/or antennas for connecting wirelessly to a network. The internal interconnect 254 that connects processing logic 260 with bus interface 244 may be implemented using a standard bus protocol, such as Coherent Hub Interface (CHI), Advanced eXtensible Interface (AXI), Advanced High-Performance Bus (AHB), or the like. The internal interconnect 254 may also be implemented using a proprietary bus protocol. In one example, an internal interconnect 253 connects bus interface 244 with memory 223 and bus interface 244 can write data to memory 223 without going through processing logic 260. Internal interconnect 253 may use the same bus protocol as internal interconnect 254. In one embodiment, an internal interconnect 255 connects processing logic 260 with Function(s) 248. Internal interconnect 255 may use the same bus protocol as internal interconnect 254.

Figure 3:
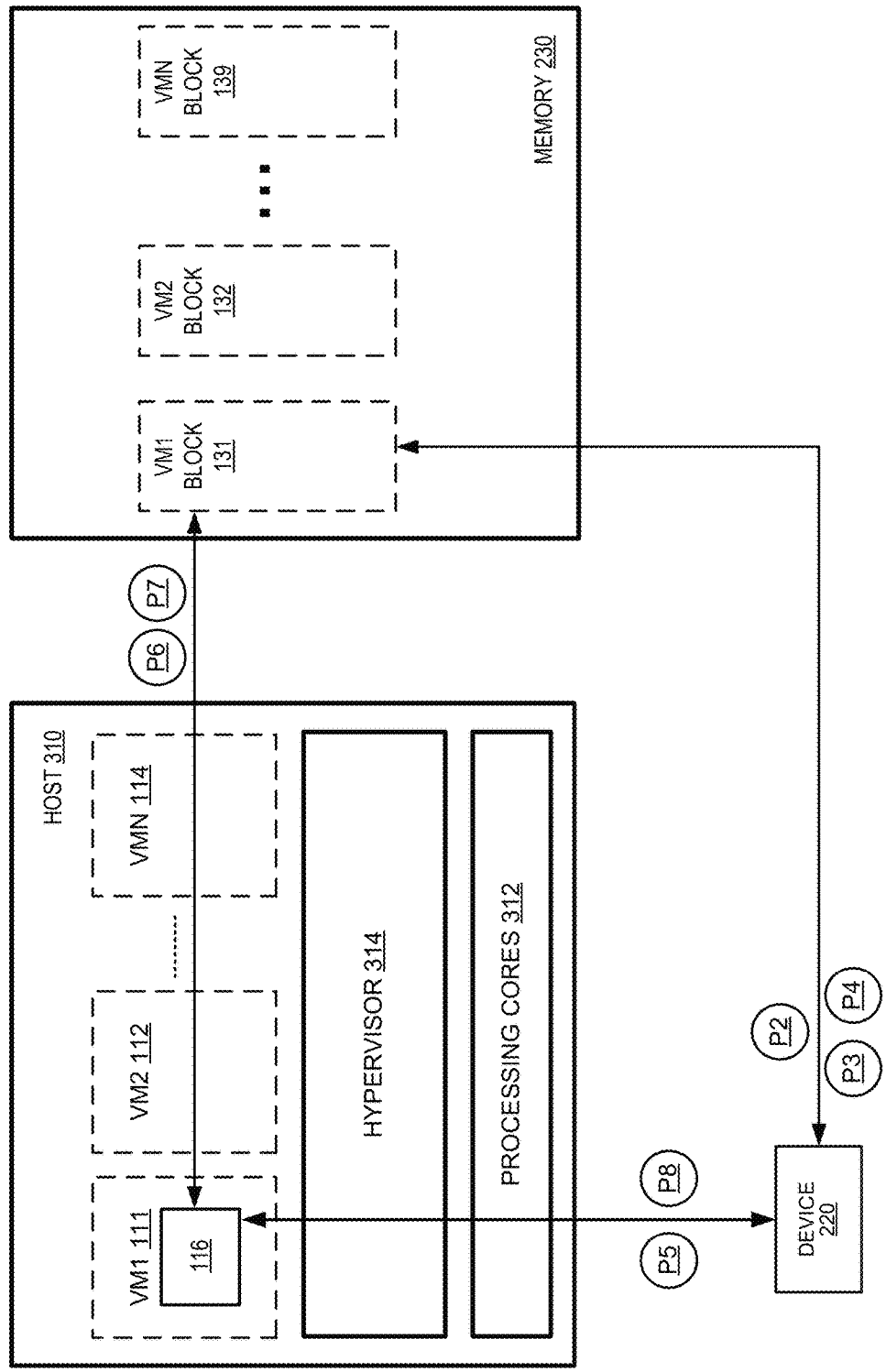
FIG. 3 illustrates an example host that includes processing cores and is running a plurality of virtual machine instances.

FIG. 3 illustrates an example host 310 that includes processing cores 312 and is running a plurality of virtual machine instances VM1 111 through VMN 114. Host 310 may be used in place of host processing logic 110/210, in some examples. In some implementations, host 310 may provide different services such as compute services, network services, etc. to various clients. For example, the compute services may include providing virtual or physical resources to the client computers, e.g., by launching virtual machine instances of various sizes, associating storage volumes to the virtual machines on demand, providing client computers with resources to run applications by renting virtual machines, data processing, storage, etc. The network services may include network related functionalities such as network traffic shaping, network acceleration, network storage processing, network switching, etc. A plurality of VMs 111-114, e.g., a first VM1 111, a second VM2 112 and an Nth VMN 114, may be configured to run on host 310. For example, each of the VMs may execute a respective guest operating system (not shown) on host 310.

In the illustrated example, each VM has a corresponding reserved block of memory in host memory 230. Specifically, first VM1 111 has a corresponding block of memory 131, second VM2 112 has a corresponding block of memory 132, and Nth VMN 114 has a corresponding block of memory 139. Of course, any other virtual machine between the first VM and the Nth VM may also have their own corresponding block of memory of host memory 130. The block of host memory corresponding to a VM may be used to store executable instructions and data generated by each VM. A portion of each block of memory may be reserved for (and be accessible to) the driver that interacts with network device 120. For example, a portion of block 131 may be reserved for driver 116 to read and write packet data. Each reserved memory block may have its own submission queue descriptor list, submission queue, and completion queue, as in FIG. 1. In other words, each VM may have its own submission queue descriptor list, submission queue, and completion queue in the VM's corresponding memory block in host memory 230. And, other VMs (e.g. VM2 112 through VMN 114) may perform similar processes as described in connection with FIG. 1.

Host 310 includes a hypervisor 314 and processing cores 312. The processing cores 312 may include a plurality of processing cores that may be configured to execute a plurality of instructions that may be stored in a computer readable storage medium (not illustrated). The computer-readable storage medium may be non-transitory. In some instances, the computer readable medium may be part of a host memory such as memory 230, e.g., RAM, ROM, EEPROM, flash memory or any suitable storage media. In some instances, the host 310 may include an x86 CPU platform, e.g., Xeon, Pentium, etc., an ARM platform, or a PowerPC platform, etc. for running an operating system (not shown). The hypervisor 314 may be configured to manage one or more VMs on the host 310, e.g., to create, start, monitor, stop or to delete the virtual machines 111-114. The hypervisor 314 can also manage the flow of information between software, the virtualized hardware, and the physical hardware.

In the illustrated embodiment, VM1 111 executes driver 116 for interacting with network device 220 and host memory 230. Driver 116 controls the MMIO write transaction to network device 220, as indicated by the illustrated process block P8 in FIG. 3. Driver 116 may also receive the interrupt from network device 220, as illustrated by process block P5. Driver 116 may also be responsible for reading the CQE from completion queue 190 and reading the packets from the packet memory 180 (process blocks P6 and P7). Although not illustrated, each VM running on host 310 may have its own driver to interact with network device 220 and host memory 230. In one example (not illustrated), the driver is executed by hypervisor 314 rather than by each virtual machine.

Figure 4:
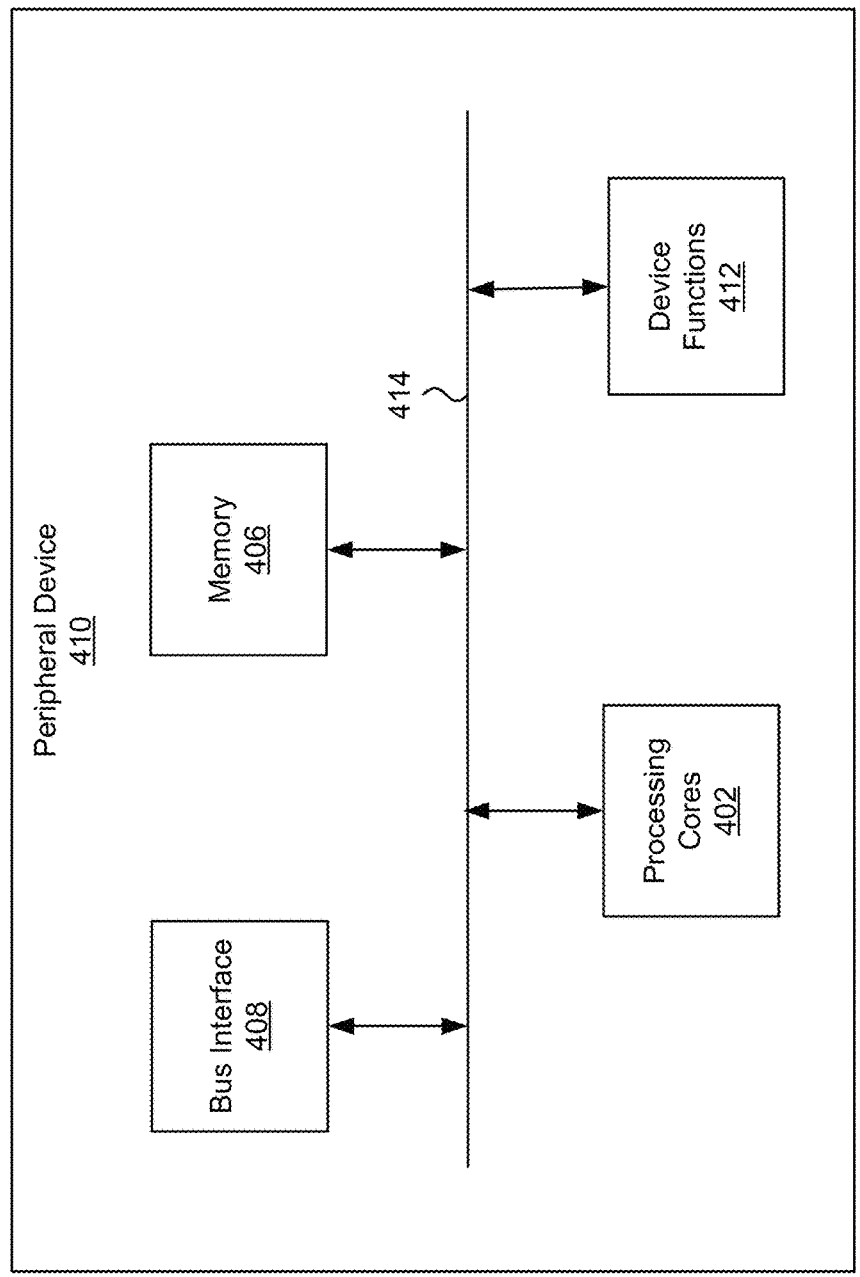
FIG. 4 illustrates an example architecture of a peripheral device that may be used in embodiments of the disclosure.

FIG. 4 illustrates an example architecture of a peripheral device 410 that may be used in embodiments where network devices 120/220 are peripheral devices. Peripheral device 410 includes processing cores 402, a bus interface 408, memory 406, and device functions 412. These modules may be hardware modules, software modules, or a combination of hardware and software. Peripheral device 410 may include additional modules, not illustrated here. In some implementations, peripheral device 410 may include fewer modules. In some implementations, one or more of the modules may be combined into one module. One or more of the modules may be in communication with each other over a communication channel 414. The communication channel 414 may include one or more busses, meshes, matrices, fabrics, a combination of these communication channels, or some other suitable communication channel.

The processing cores 402 may include one or more processors configured to execute instructions. Examples of processors that may be included in the processing cores 402 include processors developed by ARM®, MIPS®, AMD®, Intel®, Qualcomm®, and the like. In some implementations, the processors of the processing cores 402 may share certain resources, such as for example busses, level 1 (L1) caches, and/or level 2 (L2) caches. The instructions executed by the processing cores 402 may be stored on a computer-readable storage medium, for example, in the form of a computer program. The computer-readable storage medium may be non-transitory. In some cases, the computer readable medium may be part of the memory 406.

The memory 406 may include either volatile or non-volatile, or both volatile and non-volatile types of memory. The memory 406 may, for example, include random access memory (RAM), read-only memory (ROM), Electrically Erasable Programmable Read-Only Memory (EEPROM), flash memory, and/or some other suitable storage media.

The bus interface 408 may enable communication with external entities, such as a host device and/or other components in a computing system, over an external communication medium. The bus interface 408 may include a physical interface for connecting to a cable, socket, port, or other connection to the external communication medium. The bus interface 408 may further include hardware and/or software to manage incoming and outgoing transactions. The bus interface 408 may implement a local bus protocol, such as NVMe, AHCI, SCSI, SAS, SATA, PATA, or some other standard protocol, or a proprietary bus protocol. The bus interface 408 may include at least the physical layer for any of these bus protocols, including a connector, power management, and error handling, among other things. In some implementations, peripheral device 410 may include multiple bus interfaces for communicating with multiple external entities. These multiple bus interfaces may implement the same local bus protocol, different local bus protocols, or a combination of the same and different bus protocols.

The device functions 412 may include hardware and/or software for implementing features available to peripheral device 410. The device functions 412 may, for example, include physical connectors for connecting to devices such as printers, monitors, external storage drives, network cables, and other input, output, and/or networking devices. The device functions 412 may further include hardware and/or software configured to implement a protocol for communicating with externally connected devices or functions. For example, the device functions 412 may implement a network interface for communicating with network equipment, such as switches, routers, modems, and/or wireless access points. Alternatively or additionally, the device functions 412 may include hardware and/or software configured to implement functionality provided directly by the peripheral device 410. For example, the device functions 412 may include hardware and/or software configured to implement a solid state hard drive. In some implementations, peripheral device 410 may include multiple device functions, each configured to provide different functionality. For example, in these implementations, peripheral device 410 may include device functions for communicating with a wired Ethernet network, device functions for communicating with a wireless 802.11 network, and device functions providing a storage array.

In some implementations, peripheral device 410 is a PCI-based device. In these implementations, peripheral device 410 includes a PCI interface for communicating with a host device such as host 110/210. A PCI-based device may include one or more functions. A "function" describes operations that may be provided by peripheral device 410. For example, a PCI device may provide a network adapter.

In some implementations, peripheral device 410 may include single-root I/O virtualization (SR-IOV). SR-IOV is an extended capability that may be included in a PCI device. SR-IOV allows a physical resource (e.g., a single network interface card) to appear as multiple resources (e.g., sixty-four network interface card). Thus, a PCI device providing a certain functionality (e.g., a network interface card) may appear to a device making use of the PCI device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that lack configuration resources, and are generally controlled by the configuration of their underlying physical functions. Each of the physical functions and/or virtual functions may be assigned to a respective thread of execution (such as for example, a virtual machine) running on a host device.

Figure 5:
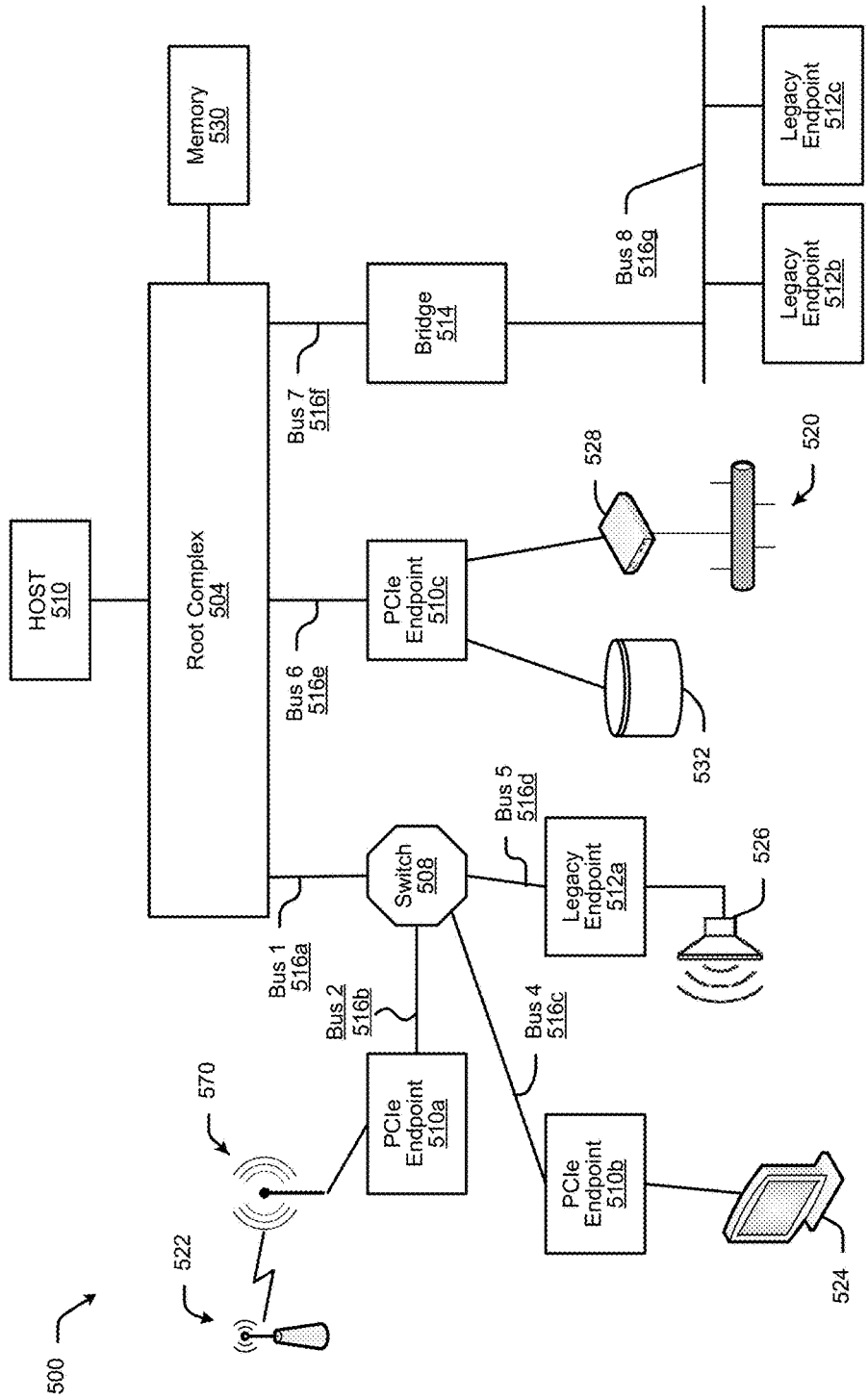
FIG. 5 illustrates an example of a computing system that includes multiple peripheral devices.

FIG. 5 illustrates an example of a computing system 500 that includes multiple peripheral devices. Peripheral devices may include hardware devices and/or devices that include a combination of hardware and software, which can be attached to a computing system to add functionality to the computing system 500. Examples of peripheral devices include wired and/or wireless network adapters (e.g. network interface cards). Generally, peripheral devices can be connected and disconnected from the computing system to change the functionality of the system. In some cases, the computing system must be powered down for a peripheral device to be added or removed. In other cases, the peripheral device can be attached or removed while the computer system is powered on (often referred to as "hot-swapping" or "hot-plugging").

The example in FIG. 5 illustrates a computing system 500 that includes peripheral devices that implement one or more variations of the Peripheral Component Interconnect (PCI) standard bus protocols. A bus is a communication channel that transfers data within a computing system, or between a computing system and other devices. A standard bus protocol is a data transfer protocol for which a specification has been defined and adopted by various manufacturers. Manufacturers ensure that compliant devices are compatible with computing systems implementing the bus protocol, and vice versa. PCI describes a family of related, standardized bus protocols. PCI includes the original PCI standard, PCI-eXtended (PCI-X), Accelerated Graphics Port (AGP), and PCI Express (PCIe, also referred to as PCI-XP). The term "PCI" or "PCI-based" may be used herein to describe any protocol in the PCI family of bus protocols. In the example shown in FIG. 5, PCI is provided as an example of a bus protocol that can be implemented by a computing system to connect to peripheral devices. A computing device can use other bus protocols, such as for example, Industry Standard Architecture (ISA), Extended ISA (EISA), Video Electronics Standards Association (VESA), Micro Channel, and any of the Advanced Technology Attachment (ATA) family of protocols, among others. The illustrated example can also be implemented with a combination of standard bus protocols, a combination of proprietary bus protocols, and/or a combination of standard and proprietary bus protocols.

The example computing system 500 may include host 510, a root complex 504, a memory subsystem 530, a switch 508, a bridge 514, and a number of peripheral devices. In this example, the peripheral devices include PCIe endpoints 510a-c and legacy endpoints 512a-c. Processors in host 510 may be general purpose computing devices such as are manufactured by Intel®, AMD®, ARM®, Qualcomm®, and others. The processors are generally capable of executing software code. A processor may include multiple processing cores. Host 510 and memory 530 are examples of host 110/210/310, and memory 130/230, respectively.

The root complex 504 may be a hardware device or a hardware and software device that connects host 510 and the memory subsystem 530 to the peripheral devices. The peripheral devices may be connected directly to the root complex 504. For example, the PCIe endpoint 510c is connected directly to the root complex 504. Alternatively or additionally, the peripheral devices may be connected to the root complex 504 through a switch 508. A bridge 514 may also be connected to the root complex 504. The root complex 504 may forward transactions to host 510 and direct responses from host 510 back to the peripheral devices. Queue requests and packet descriptors may be routed to peripheral devices through switch 508 or bridge 514. The root complex 504 may further generate transactions on behalf of host 510, and forward responses to those transactions back to host 510. In some cases, the root complex 504 may also route transactions from one peripheral device to another, and/or between peripheral devices, switches, and bridges. The root complex 504 may provide services for the computer system 500, such as a hot plug controller, a power management controller, an interrupt controller, and/or error detection and reporting. In some implementations, the root complex 504 may be implemented as part of a host system that includes one or more integrated processors and memory.

The switch 508 functions as a multi-port connector between various devices, including the root complex 504, peripheral devices, and possibly other switches and bridges. The switch 508 may route transactions between any of the devices connected to it. For example, the switch 508 may route transactions between the PCIe endpoints 510a-b and the legacy endpoint 512a, and between the various endpoints 510a-b, 512a and the root complex 504. The switch 508 may also provide arbitration to prioritize incoming and outgoing transactions. Devices connected to the switch 508 may treat the switch 508 as another requester and/or completer. Though not illustrated here, switches can also be connected to other switches to further expand the number of peripheral devices that can be connected to the computing system 500.

The bridge 514 may provide connectivity to other busses or switching fabrics. The other busses or switching fabrics may implement a PCI variant or another protocol. For example, in the example of FIG. 5, the bridge 514 provides connectivity to a bus implementing the original PCI standard. The bridge 514 may include mechanisms to translate from one bus protocol, such as the original PCI standard, to another protocol, such as PCIe.

Components in the computing system 500 may be connected through a shared bus. For example, in the illustrated example, the legacy endpoints 512b-c are connected to a shared PCI bus 516g. Alternatively or additionally, peripheral devices may be connected to the computing system 500 in a switching fabric topology. The interconnected devices illustrated in FIG. 5, including the root complex 504, the switch 508, the bridge 514, and the PCIe endpoints 510a-c, form an example of a switching fabric. A switching fabric topology includes point-to-point connections between the devices connected to the fabric, and may include a routing system for passing messages between the devices. In a switching fabric, transactions may be spread across multiple physical links. In the example of FIG. 5, the switch 508 is connected to the root complex 504 with Bus 1 516a and the PCIe endpoint 510c is connected to the root complex with Bus 6 516e. Similarly, the bridge 514 is connected to the root complex with Bus 7 516f. Each of the PCIe endpoints 510a-b and the legacy endpoint 512a are also connected to the switch 508a with individual busses 516b-d. The connections between each of the root complex 504, the switch 508, the bridge 514, the PCIe endpoints 510a-c and the legacy endpoint 512a are point-to-point because each of the busses 516a-g are not shared with another device. Furthermore, a packet directed from one device to another (for example, from the root complex 504 to the PCIe endpoint 510a) is routed directly to its destination.

In some implementations, the connections between the devices in the computing system 500 may be numbered. For example, in the illustrated example, the connection between the switch 508 and the root complex 504 is labeled Bus 1 516a (Bus 0 may be internal to the root complex 504). Similarly, each of the busses connecting the PCIe endpoints 510a-b and the legacy endpoint 512a to the switch 508 are labeled Bus 2 516b, Bus 4 516c, and Bus 5 516d, respectively (Bus 2 may be internal to the switch 508). Furthermore, the connection between the root complex 504 and the PCIe endpoint 510c may be labeled Bus 6 516e, while the connection between the root complex and the bridge 514 may be labeled Bus 7 516f. Finally, the shared bus downstream from the bridge 514 may be labeled Bus 8 516g. In most cases the numbering of the busses is arbitrary, though bus numbers are generally assigned in a logical fashion. For example, Bus 0 may be located within the root complex 504, and the bus label may increment as the distance between the bus and the root complex 504 increases.

As noted above, peripheral devices may add to and/or modify the functionality of the computing system 500. For example, one PCIe endpoint 510a may implement a Wi-Fi adapter 570. Using the Wi-Fi adapter 570, the computing system 500 may be able to communicate wirelessly with a wireless access point 522, and thereby access a network. As another example, another PCIe endpoint 510b may implement a video card. A video card may include a port to connect a monitor 524 or other display device. As a further example, the computing system 500 may include a legacy endpoint 512a that implements a sound card. A sound card may include a port or jack that accepts a plug for a speaker 526 or other audio output device.

In some cases, a PCIe endpoint may be a multi-function device, that is, a device that provides the services of multiple devices. For example, the PCIe endpoint 510c may include an Ethernet adapter, and provide a connection to a gateway device 528, such as a DSL or cable modem. The PCIe endpoint 510c may also include a storage adapter, and provide a connection to a storage device 532. The one PCIe endpoint 510c thus may provide access to a network 520, as well as access to a storage device 532. The hardware and/or software components in the peripheral device that provide the services of, for example, a network interface or a storage controller may be called a "function." In the context of PCI devices, the terms "function" and "service" may be synonymous, though in other contexts this is not necessarily the case. Types of functions that may be provided by a peripheral device include, for example, mass storage controllers, network controllers, display controllers, multimedia devices, memory controllers, bridges, input devices docking stations, serial bus controllers, wireless controllers, satellite communications controllers, and encryption/decryption controllers, among others. In some implementations, functions can be added to a peripheral device, for example by connecting daughter cards or external devices to expansion slots or external ports on the peripheral device. In some implementations, a multi-function PCI device may provide up to eight separate functions. In many implementations, the functions provided by a peripheral device may be identified by a function number.

When a computing system such as computing system 500 illustrated in FIG. 5 initially powers up, host 510 may be unaware of any peripheral devices that are connected to the system. Host 510 may be aware of the root complex 504, and possibly also that the root complex 504 is connected to one or more busses. To learn about the rest of the system, host 510 may execute a process to scan and configure the system. This process may be referred to as an enumeration process. The specific process of scanning for, locating, and identifying peripheral devices may be called discovery or discovering. During an enumeration process, software executing on the host 510 may first scan each of the busses 516a, 516e, 516f connected to the root complex 504, and identify the switch 508, the PCIe endpoint 510c, and the bridge 514. Upon discovering the switch 508, host 510 may next scan the busses 516b-d connected to the switch 508. Host 510 thereby discovers the PCIe endpoints 510a-c and the legacy endpoint 512a. Upon discovering the bridge 514, host 510 may also scan Bus 8 516g; however, the bridge 514 may translate the scanning instructions to the protocol implemented by Bus 8 516g.

While scanning the busses, or possibly after, host 510 may also transmit configuration transactions to each of the devices it discovers. Configuration may include, for example, assigning one or more address spaces. For example, PCI devices typically include one or more of a memory address space and/or an I/O address space. Each of these address spaces may be subdivided into multiple blocks. These address spaces and address space blocks may each be assigned a base address, where the base address establishes the region of memory that is assigned to the address space. In some implementations, these base addresses may be stored in configuration registers in a configuration space included in a device. Software executing on host 510 may be responsible for managing all available memory, and, for example, ensuring that no two devices are assigned overlapping memory regions. Alternatively or additionally, memory may be managed by a memory controller.

Configuration may further include programming information, such as a bus number and/or a device number, into configuration registers included in the peripheral devices. During configuration, host 510 may also read information from configuration registers. For example, the PCIe endpoint 510c may include a configuration register that indicates that it has two functions. The PCIe endpoint 510c may further include separate configuration registers for each function. Each function's configuration registers may further include information that indicates the capabilities of each function. For example, a configuration register may indicate that Function 0 is a mass storage controller, and another configuration register may indicate that Function 1 is a network interface. In most implementations, configuration registers are included in the hardware of a device.

In some implementations, the switch 508 and the bridge 514 also include a configuration space with configuration registers. In such implementations, host 510 may discover the switch and bridge functionality by reading configuration registers in the switch 508 and the bridge 514. The switch 508 and the bridge 514 may also be configured by host 510, for example with bus and device numbers.

Figure 6:
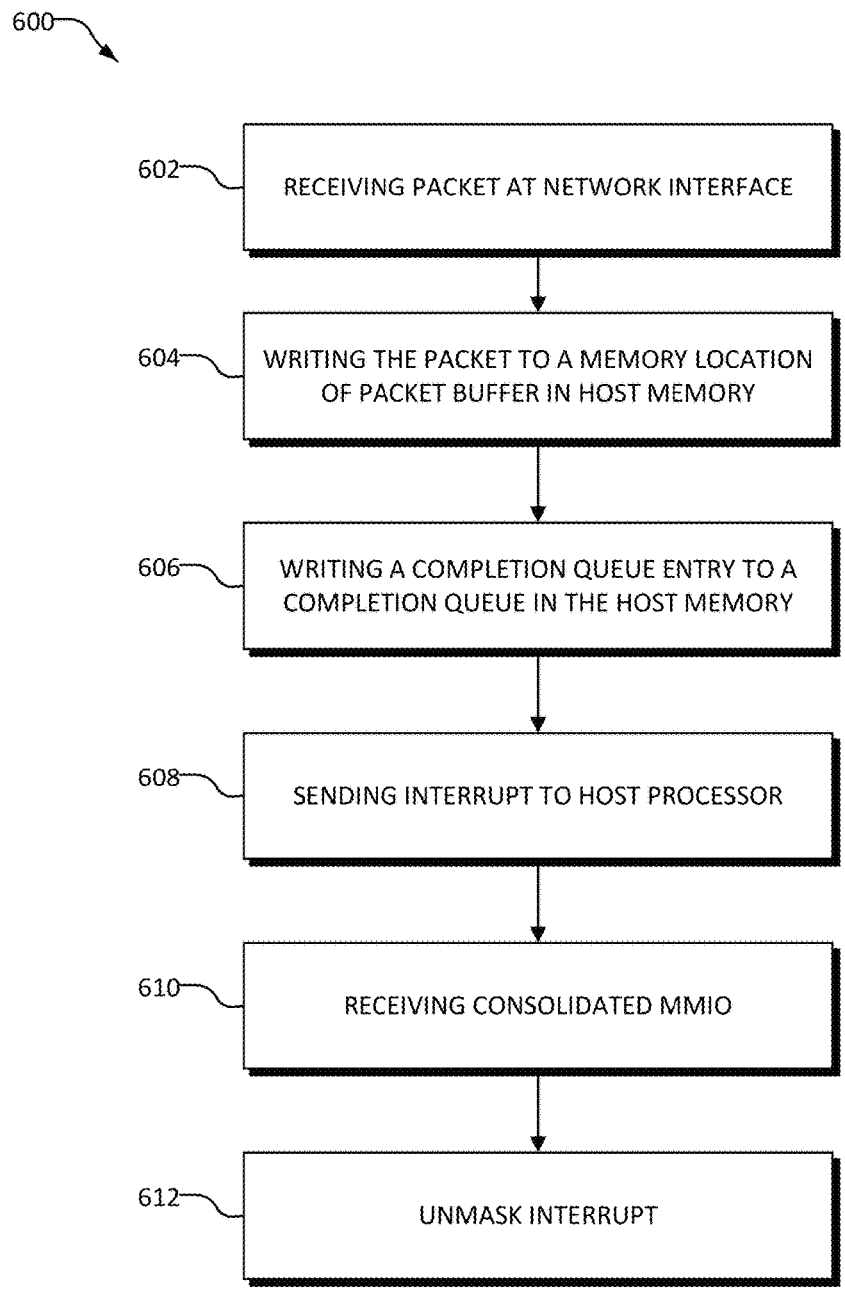
FIG. 6 illustrates an example flow chart demonstrating an example process of consolidating write transactions on a bus.

FIG. 6 depicts an illustrative flow chart demonstrating an example process 600 of consolidating MMIO write transactions. The network device may be a network interface card (NIC). The process 600 is illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement this process and any other processes described herein.

Some or all of the process 600 (or any other processes described herein, or variations and/or combinations thereof) may be performed under the control of one or more computer systems configured with executable instructions and may be implemented as code (e.g., executable instructions, one or more computer programs or one or more applications). In accordance with at least one embodiment, the process 600 of FIG. 6 may be performed by network devices 120 or 220. The code may be stored on a computer-readable storage medium of network device 120 or 220, for example, in the form of a computer program including a plurality of instructions executable by one or more processors. The computer-readable storage medium may be non-transitory.

In process block 602, a packet (e.g. packet 199) is received at a network interface (e.g. network interface 197) of a network device. The packet or at least a portion of the packet (e.g. packet payload) is written to a packet memory (e.g. packet memory 180) located in a host memory, in process block 604. In one example, the packet data is written to the packet memory by a DMA engine (e.g. DMA engine 265) included in processing logic of the network device. The packet memory location of the packet memory to write the packet data to may be determined by reading a descriptor entry from a submission queue descriptor list (e.g. submission queue descriptor list 170).

In process block 606, a CQE is written to a completion queue (e.g. completion queue 190) in the host memory. The CQE corresponds to the packet memory location that the packet data was written to in process block 604. Writing the CQE to the completion queue may also be done with the DMA engine of the network device to write the CQE directly to host memory over a bus (e.g. bus 150) that is communicatively coupled between the network device and the host memory.

In process block 608, an interrupt is sent from the network device to the host processor. The interrupt may be an MSI or MSI-X that is sent over the bus 150, where bus 150 is a PCI-based bus. In process block 610, a consolidated MMIO write transaction is received by a bus interface (e.g. bus interface 144) of the network device. The consolidated MMIO write transaction includes a completion head pointer and an interrupt unmasking value. The consolidated MMIO write transaction may also include an interrupt delay value. The MMIO write transaction may be written to a register (e.g. register 129) of the network device. In process block 612, the interrupt generated in process block 608 is unmasked. Writing the interrupt unmasking value to the register may unmask the interrupt.

As described above, a plurality of VMs may be running on a host processor. In one implementation, a single MMIO write transaction includes a first completion queue head pointer and a first interrupt unmasking value corresponding to a first VM as well as a second completion queue head pointer and a second interrupt unmasking value corresponding to a second VM. A first interrupt delay value corresponding to the first VM and a second interrupt delay value corresponding to the second VM may also be included in the single MMIO write transaction. In one implementation, the single MMIO write transaction is 64 bits. In this case, the first and second completion queue head pointers may be 16 bits, the first and second interrupt delay values may be 15 bits, and the first and second interrupt unmasking values may be 1 bit. Consolidating these data elements from multiple VMs may reduce bus traffic on a PCI-based bus even further.

Figure 7:
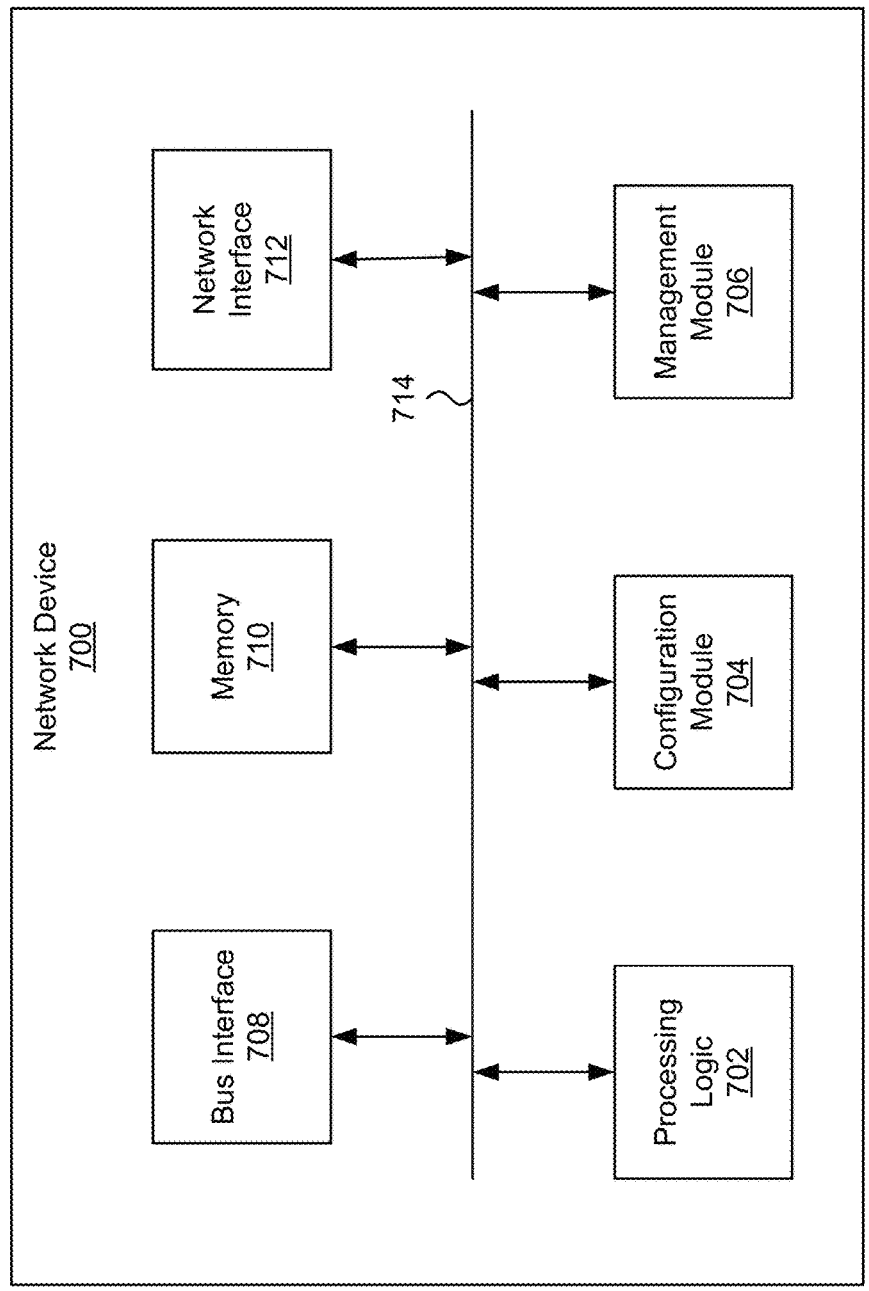
FIG. 7 illustrates an example of a network device, according to certain aspects of the disclosure.

FIG. 7 illustrates an example of a network device 700. Functionality and/or several components of the network device 700 may be used without limitation with other embodiments disclosed elsewhere in this disclosure, without limitations. For example, network devices 120/220 may include all or some of the modules of network device 700. A network device 700 may facilitate processing of packets and/or forwarding of packets from the network device 700 to another device. As referred to herein, a "packet" or "network packet" may refer to a variable or fixed unit of data. In some instances, a packet may include a packet header and a packet payload. The packet header may include information associated with the packet, such as the source, destination, quality of service parameters, length, protocol, routing labels, error correction information, etc. In certain implementations, one packet header may indicate information associated with a series of packets, such as a burst transaction. In some implementations, the network device 700 may be the recipient and/or generator of packets. In some implementations, the network device 700 may modify the contents of the packet before forwarding the packet to another device. The network device 700 may be a peripheral device coupled to another computer device, a switch, a router or any other suitable device enabled for receiving and forwarding packets.

In one example, the network device 700 may include processing logic 702, a configuration module 704, a management module 706, a bus interface module 708, memory 710, and a network interface module 712. These modules may be hardware modules, software modules, or a combination of hardware and software. In certain instances, modules may be interchangeably used with components or engines, without deviating from the scope of the disclosure. The network device 700 may include additional modules, not illustrated here, such as components discussed with respect to the nodes disclosed in FIG. 8. In some implementations, the network device 700 may include fewer modules. In some implementations, one or more of the modules may be combined into one module. One or more of the modules may be in communication with each other over a communication channel 714. The communication channel 714 may include one or more busses, meshes, matrices, fabrics, a combination of these communication channels, or some other suitable communication channel.

The processing logic 702 may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 702 may include processors developed by ARM®, MIPS®, AMID®, Intel®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 702 may be stored on a computer-readable storage medium, for example, in the form of a computer program. The computer-readable storage medium may be non-transitory. In some cases, the computer-readable medium may be part of the memory 710.

The memory 710 may include either volatile or non-volatile, or both volatile and non-volatile types of memory. The memory 710 may, for example, include random access memory (RAM), read only memory (ROM), Electrically Erasable Programmable Read-Only Memory (EEPROM), flash memory, and/or some other suitable storage media. In some cases, some or all of the memory 710 may be internal to the network device 700, while in other cases some or all of the memory may be external to the network device 700. The memory 710 may store an operating system comprising executable instructions that, when executed by the processing logic 702, provides the execution environment for executing instructions providing networking functionality for the network device 700. The memory may also store and maintain several data structures and routing tables for facilitating the functionality of the network device 700.

In some implementations, the configuration module 704 may include one or more configuration registers. Configuration registers may control the operations of the network device 700. In some implementations, one or more bits in the configuration register can represent certain capabilities of the network device 700. Configuration registers may be programmed by instructions executing in the processing logic 702, and/or by an external entity, such as a host device, an operating system executing on a host device, and/or a remote device. The configuration module 704 may further include hardware and/or software that control the operations of the network device 700.

In some implementations, the management module 706 may be configured to manage different components of the network device 700. In some cases, the management module 706 may configure one or more bits in one or more configuration registers at power up, to enable or disable certain capabilities of the network device 700. In certain implementations, the management module 706 may use processing resources from the processing logic 702. In other implementations, the management module 706 may have processing logic similar to the processing logic 702, but segmented away or implemented on a different power plane than the processing logic 702.

The bus interface module 708 may enable communication with external entities, such as a host device and/or other components in a computing system, over an external communication medium. The bus interface module 708 may include a physical interface for connecting to a cable, socket, port, or other connection to the external communication medium. The bus interface module 708 may further include hardware and/or software to manage incoming and outgoing transactions. The bus interface module 708 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 708 may include the physical layer for any of these bus protocols, including a connector, power management, and error handling, among other things. In some implementations, the network device 700 may include multiple bus interface modules for communicating with multiple external entities. These multiple bus interface modules may implement the same local bus protocol, different local bus protocols, or a combination of the same and different bus protocols.

The network interface module 712 may include hardware and/or software for communicating with a network. This network interface module 712 may, for example, include physical connectors or physical ports for wired connection to a network, and/or antennas for wireless communication to a network. The network interface module 712 may further include hardware and/or software configured to implement a network protocol stack. The network interface module 712 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the network device 700 may include multiple network interface modules, each configured to communicate with a different network. For example, in these implementations, the network device 700 may include a network interface module for communicating with a wired Ethernet network, a wireless 802.11 network, a cellular network, an Infiniband network, etc.

The various components and modules of the network device 700, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems as disclosed with respect to FIG. 8.

Figure 8:
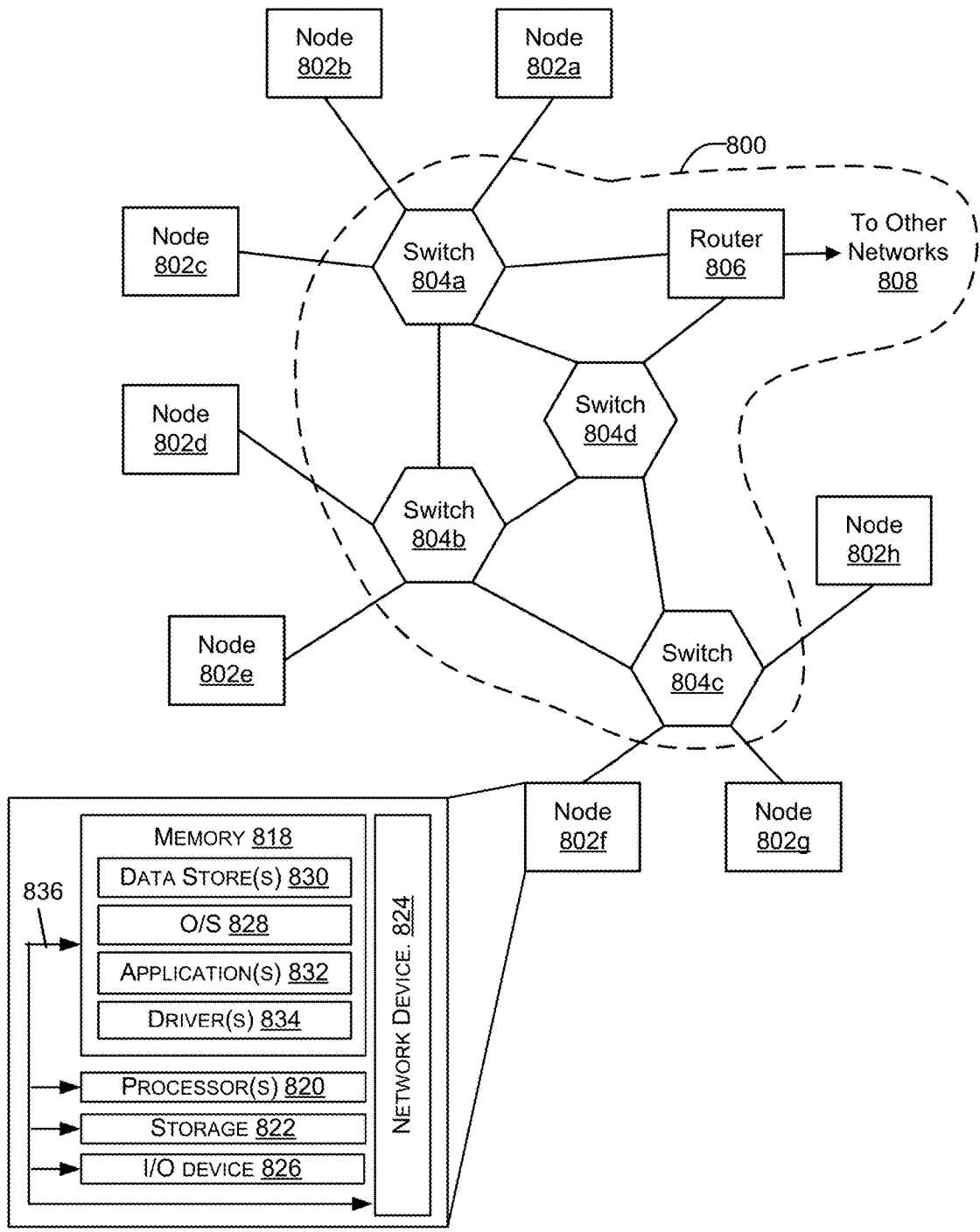
FIG. 8 illustrates an example architecture for features and systems described herein that includes one or more service provider computers and/or a user device connected via one or more networks, according to certain aspects of the disclosure.

FIG. 8 illustrates a network 800, illustrating various different types of network devices 700 of FIG. 7, such as nodes comprising the network device, switches and routers. In certain embodiments, the network 800 may be based on a switched architecture with point-to-point links. As illustrated in FIG. 8, the network 800 includes a plurality of switches 804a-804d, which may be arranged in a network.

In some cases, the switches are arranged in a multi-layered network, such as a Clos network. A network device 700 that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. Switches 804a-804d may be connected to a plurality of nodes 802a-802h and provide multiple paths between any two nodes.

The network 800 may also include one or more network devices 700 for connection with other networks 808, such as other subnets, LANs, wide area networks (WANs), or the Internet, and may be referred to as routers 806. Routers use headers and forwarding tables to determine the best path for forwarding the packets, and use protocols such as internet control message protocol (ICMP) to communicate with each other and configure the best route between any two devices.

In some examples, network(s) 800 may include any one or a combination of many different types of networks, such as cable networks, the Internet, wireless networks, cellular networks and other private and/or public networks. Interconnected switches 804a-804d and router 806, if present, may be referred to as a switch fabric, a fabric, a network fabric, or simply a network. In the context of a computer network, terms "fabric" and "network" may be used interchangeably herein.

Nodes 802a-802h may be any combination of host systems, processor nodes, storage subsystems, and I/O chassis that represent user devices, service provider computers or third party computers.

User devices may include computing devices to access an application 832 (e.g., a web browser or mobile device application). In some aspects, the application 832 may be hosted, managed, and/or provided by a computing resources service or service provider. The application 832 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 808. Additionally, the user device(s) may be part of the distributed system managed by, controlled by, or otherwise part of the service provider computer(s) (e.g., a console device integrated with the service provider computers).

The node(s) of FIG. 8 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some embodiments, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 832 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 802a-802h may include at least one memory 818 and one or more processing units (or processor(s) 820). The processor(s) 820 may be implemented in hardware, computer-executable instructions, firmware, or combinations thereof. Computer-executable instruction or firmware implementations of the processor(s) 820 may include computer-executable or machine-executable instructions written in any suitable programming language to perform the various functions described.

In some instances, the hardware processor(s) 820 may be a single core processor or a multi-core processor. A multi-core processor may include multiple processing units within the same processor. In some embodiments, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 818 may store program instructions that are loadable and executable on the processor(s) 820, as well as data generated during the execution of these programs. Depending on the configuration and type of the node(s) 802a-802h, the memory 818 may be volatile (such as RAM) and/or non-volatile (such as ROM, flash memory, etc.). The memory 818 may include an operating system 828, one or more data stores 830, one or more application programs 832, one or more drivers 834, and/or services for implementing the features disclosed herein.

The operating system 828 may support nodes 802a-802h basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, iOS, Android, and the like. The operating system 828 may also be a proprietary operating system.

The data stores 830 may include permanent or transitory data used and/or operated on by the operating system 828, application programs 832, or drivers 834. Examples of such data include web pages, video data, audio data, images, user data, and so on. The information in the data stores 830 may, in some implementations, be provided over the network(s) 808 to user devices 804. In some cases, the data stores 830 may additionally or alternatively include stored application programs and/or drivers. Alternatively or additionally, the data stores 830 may store standard and/or proprietary software libraries, and/or standard and/or proprietary application user interface (API) libraries. Information stored in the data stores 830 may be machine-readable object code, source code, interpreted code, or intermediate code.

The drivers 834 include programs that may provide communication between components in a node. For example, some drivers 834 may provide communication between the operating system 828 and additional storage 822, network device 824, and/or I/O device 826. Alternatively or additionally, some drivers 834 may provide communication between application programs 832 and the operating system 828, and/or application programs 832 and peripheral devices accessible to the service provider computer. In many cases, the drivers 834 may include drivers that provide well-understood functionality (e.g., printer drivers, display drivers, hard disk drivers, Solid State Device drivers). In other cases, the drivers 834 may provide proprietary or specialized functionality.

The service provider computer(s) or servers may also include additional storage 822, which may include removable storage and/or non-removable storage. The additional storage 822 may include magnetic storage, optical disks, solid state disks, flash memory, and/or tape storage. The additional storage 822 may be housed in the same chassis as the node(s) 802a-802h or may be in an external enclosure. The memory 818 and/or additional storage 822 and their associated computer-readable media may provide non-volatile storage of computer-readable instructions, data structures, program modules, and other data for the computing devices. In some implementations, the memory 818 may include multiple different types of memory, such as SRAM, DRAM, or ROM.

The memory 818 and the additional storage 822, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 818 and the additional storage 822 are examples of computer storage media. Additional types of computer storage media that may be present in the node(s) 802a-802h may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 802a-802h. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 802a-802h may also include I/O device(s) 826, such as a keyboard, a mouse, a pen, a voice input device, a touch input device, a display, speakers, a printer, and the like. The node(s) 802a-802h may also include one or more communication channels 836. A communication channel 836 may provide a medium over which the various components of the node(s) 802a-802h can communicate. The communication channel or channels 836 may take the form of a bus, a ring, a switching fabric, or a network.

The node(s) 802a-802h may also contain network device(s) 824 that allow the node(s) 802a-802h to communicate with a stored database, another computing device or server, user terminals and/or other devices on the network(s) 800. The network device(s) 824 of FIG. 8 may include similar components discussed with reference to the network device 700 of FIG. 7. In some implementations, the network device 824 is a peripheral device, such as a PCI-based device. In these implementations, the network device 824 includes a PCI interface for communicating with a host device.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A network device comprising:
   a network interface operable to send and receive a packet;
   a bus interface operable to send and receive bus traffic on a bus; and
   processing logic coupled to the bus interface and the network interface, wherein the processing logic is operable to:
      store information associated with the packet in a queue;
      mask interrupts for the network device;
      send an interrupt to a host processor to notify the host processor of completion of packet processing;
      receive, by the bus interface, a Memory-Mapped Input/Output (MMIO) write transaction that includes an update for a pointer associated with a completion queue and an interrupt unmasking value;
      update the pointer associated with the completion queue; and unmask the interrupts for the network device based on the MMIO write transaction.

2. The network device of claim 1, wherein storing the information associated with the packet includes:
   writing the packet to a memory location in a packet memory in a host memory accessible by the host processor; and
   writing a completion queue entry (CQE) to the completion queue, wherein the completion queue is located in the host memory, and wherein the CQE corresponds to the memory location or a descriptor entry.

3. The network device of claim 2, wherein updating the pointer includes updating a completion queue head pointer indicating a last CQE that has been processed by the host processor.

4. The network device of claim 3, wherein the completion queue and a submission queue descriptor list have a one-to-one correspondence.

5. The network device of claim 2, wherein the processing logic is further operable to:
   read a descriptor entry in a submission queue descriptor list to determine the memory location to write the packet to.

6. The network device of claim 5, wherein the submission queue descriptor list is in the host memory.

7. The network device of claim 5, wherein the submission queue descriptor list is in a device memory of the network device.

8. The network device of claim 2, wherein the interrupt is specific to the completion queue.

9. The network device of claim 2, wherein the MMIO write transaction includes an interrupt delay value that sets a time delay between writing the CQE and sending the interrupt.

10. The network device of claim 1, wherein the interrupt is a Message Signaled Interrupt-X (MSI-X).

11. The network device of claim 1, wherein the bus is a PCI-based bus.

12. The network device of claim 1, wherein the queue is in a memory block of a host memory, and wherein the memory block is reserved for a first virtual machine (VM) exectable by the host processor.

13. The network device of claim 12, wherein the first VM is operable to initiate the MMIO write transaction.

14. The network device of claim 1 further comprising:
   receiving a notification from the host processor that the packet is ready for transmission;
   fetching the packet from a host memory; and
   transmitting, by the network interface, the packet onto a network.

15. A method comprising:
   receiving, by a network interface of a network device, a packet;
   writing the packet to a memory location in a packet memory in a host memory accessible by a host processor;
   writing a completion queue entry (CQE) to a completion queue in the host memory, wherein the CQE indicates the memory location in the packet memory;
   sending an interrupt from the network device to the host processor;
   receiving, by a bus interface of the network device, a Memory-Mapped Input/Output (MMIO) write transaction that includes a completion queue head pointer value and an interrupt unmasking value, the completion queue head pointer value indicating a last CQE in the completion queue in the host memory that has been processed by the host processor; and
   unmasking the interrupt with the interrupt unmasking value.

16. The method of claim 15, wherein the MMIO write transaction includes a second completion queue head pointer value, the completion queue head pointer value corresponding to the completion queue of a first virtual machine (VM) running on the host processor and the second completion queue head pointer value corresponding to a second completion queue of the first VM running on the host processor.

17. The method of claim 15, wherein the MMIO write transaction includes an interrupt delay value that sets a time delay between writing the CQE and sending the interrupt.

18. The method of claim 15, wherein the network device is a Network Interface Card (NIC).

* * * * *